US006453292B2

(12) United States Patent
Ramaswamy et al.

(10) Patent No.: US 6,453,292 B2
(45) Date of Patent: ***Sep. 17, 2002

(54) COMMAND BOUNDARY IDENTIFIER FOR CONVERSATIONAL NATURAL LANGUAGE

(75) Inventors: Ganesh N. Ramaswamy, Ossining, NY (US); Jan Kleindienst, Kladno-Krocehlavy (CZ)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,322

(22) Filed: Oct. 28, 1998

(51) Int. Cl.[7] ............................................. G10L 15/00
(52) U.S. Cl. ...................................... 704/235; 705/253
(58) Field of Search ................................. 704/235, 275, 704/256, 257, 253, 251

(56) References Cited

U.S. PATENT DOCUMENTS

| 5,199,080 A | | 3/1993 | Kimura et al. | |
| 5,479,563 A | * | 12/1995 | Yamaguchi | 704/232 |
| 5,594,834 A | * | 1/1997 | Wang | 704/253 |
| 5,638,487 A | * | 6/1997 | Chigier | 704/253 |
| 5,729,656 A | * | 3/1998 | Nahamoo et al. | 704/254 |
| 5,794,189 A | * | 8/1998 | Gould | 704/231 |
| 5,794,196 A | * | 8/1998 | Yegnanarayanan et al. | 704/255 |
| 5,812,973 A | * | 9/1998 | Wang | 704/253 |
| 5,940,794 A | * | 8/1999 | Abe | 704/253 |
| 6,003,005 A | * | 12/1999 | Hirschberg | 704/260 |

FOREIGN PATENT DOCUMENTS

EP 0773532 A3 5/1997

OTHER PUBLICATIONS

Wilpon et al. "Automatic Recognition of Keywords in Unconstrained Speech Using Hidden Markov Models", IEEE Trans. Acoustics, Speech and Signal Proc., vol. 38, No. 11, 1990, pp. 1870–1878.*

Takebayashi et al. "Keyword Spotting in Noisy Continuous Speech Using Word Pattern Vector Subtraction and Noise Immunity Learning", IEEE Int. Conf. on Acoustics, Speech and Signal Proc., ICASSP–92, vol. 2, 1992, pp. 85–88.*

Berger et al., "A Maximum Entropy Approach to Natural Language Processing," Computational Linguistics, vol. 22, No. 1, pp. 39–71, Mar. 1996.

Della Pietra et al., "Inducing Features of Random Fields," Technical Report CMU–CS95–144, School of Comoputer Science, Carnegie Mellon University, 1995.

Palmer et al., "Adaptive Multilingual Sentence Boundary Disambiguation," Computational Linguistics, vol. 23, No. 2, pp. 241–267, Jun. 1997.

Papineni et al., Feature–Based Language Understanding, Eurospeech, Rhodes, Greece, 1997.

Ratnaparkhi, A., "A Simple Introduction to Maximum Entropy Models for Natural Language Processing," Institute for Research in Cognitive Science, Report 97–08, University of Pennsylvania, May 1997.

Reynar et al., "A Maximum Entropy Approach to Identifying Sentence Boundaries," Fifth Conference on Applied Natural Language Processing, Washington, D.C., pp. 16–19, Apr. 1997.

* cited by examiner

*Primary Examiner*—Richemond Dorvil
*Assistant Examiner*—Angela Armstrong
(74) *Attorney, Agent, or Firm*—F. Chau&Associates, LLP

(57) ABSTRACT

An apparatus for automatically identifying command boundaries in a conversational natural language system, in accordance with the present invention, includes a speech recognizer for converting an input signal to recognized text and a boundary identifier coupled to the speech recognizer for receiving the recognized text and determining if a command is present in the recognized text, the boundary identifier outputting the command if present in the recognized text. A method for identifying command boundaries in a conversational natural language system is also included.

30 Claims, 3 Drawing Sheets

COMMAND BOUNDARY IDENTIFIER FOR CONVERSATIONAL NATURAL LANGUAGE

BACKGROUND OF THE INVENTION

1. Field of the Invention

The present invention relates to speech recognition and, more particularly, to an apparatus and method for identifying command boundaries from natural conversational speech.

2. Description of the Related Art

Natural language user interface systems includes systems which permit a speaker to input commands to the system by saying the commands. However, state-of-the-art conversational natural language user interface systems typically require the user to indicate the end of a command, or the command boundary, through some form of manual input, such as pausing between commands or clicking a microphone control button on the display. Such a requirement makes the user interface quite cumbersome to use and may result in unwanted delays.

Therefore, a need exists for a trainable system that can automatically identify command boundaries in a conversational natural language user interface.

SUMMARY OF THE INVENTION

An apparatus for automatically identifying command boundaries in a conversational natural language system, in accordance with the present invention, includes a speech recognizer for converting an input signal to recognized text and a boundary identifier coupled to the speech recognizer for receiving the recognized text and determining if a command is present in the recognized text, the boundary identifier outputting the command if present in the recognized text.

In alternate embodiments, the boundary identifier may output to an application which executes the command. The boundary identifier may include an input processor for processing the recognized text. The input processor may process the recognized text by augmenting each word in the recognized text by the word's relative position with respect to a hypothesized command boundary. The boundary identifier may further include a feature detector coupled to the input processor, the feature detector for determining which feature functions, from a set of feature functions, are present in the processed recognized text. The boundary identifier may further include a decision maker for determining if a command is present in the processed recognized text according to a set of feature weights corresponding to the feature functions in the processed recognized text. The decision maker may be coupled to the feature detector and may decide if the processed recognized text includes a command boundary.

In still other embodiments, a training system for training the apparatus to recognize text and to recognize complete commands may be included. The training system may include an input processor for processing a collection of training data comprising utterances which include complete commands and other than complete commands. The input processor may insert a token before each utterance in the training data. The input processor may insert a token before a first utterance in the recognized text, and after every command in the recognized text. A feature extractor may be included for extracting feature functions including words and relative positions of the words with respect to a hypothesized command boundary location. The speech recognizer may include a language model that has been trained using training data, the training data including a token inserted to indicate a location of a command boundary in the training data. The speech recognizer may include additional baseforms for the token. The speech recognizer may produce the recognized text including the token. The boundary identifier may declare a command boundary when there is an extended period of silence in the recognized text.

A program storage device readable by machine, tangibly embodying a program of instructions executable by the machine to perform method steps for identifying commands in recognized text, the method steps include inputting recognized text, processing the recognized text by augmenting words of the recognized text with a position relative to a hypothesized command boundary, determining feature functions in the processed recognized text in accordance with a set of feature functions, deciding whether the processed recognized text with feature functions identified includes a command, the decision being made base on weighting of feature functions and if a command is included, outputting the command.

In alternate embodiments, a program of instructions for training the program storage device by inputting training data including utterances comprising commands and other than commands may be included. The steps of placing a token before each utterance may be included. The step of placing a token after each command boundary included in the utterances may also be included. The program of instructions for training the program storage device may includes the step of extracting feature functions from the training data. The program of instructions for training the program storage device may include the step of determining feature weights for all feature functions. The program of instructions for processing the recognized text may include the step of placing a token before a first utterance in the recognized text and after each command in the recognized text. The program storage device may further include a speech recognizer for providing the recognized text.

A method for identifying commands in natural conversational language includes the steps of inputting recognized text, processing the recognized text by augmenting words of the recognized text with a position relative to a hypothesized command boundary, determining feature functions in the processed recognized text in accordance with a set of feature functions, deciding whether the processed recognized text with feature functions identified includes a command, the decision being made base on weighting of feature functions and if a command is included, outputting the command.

In other methods, the step of inputting training data including utterances comprising commands and other than commands may be included. The steps of placing a token before each utterance of the training data may also be included. The method may further include the step of placing a token after command boundaries included in the utterances. The method may include the step of extracting feature functions from the training data. The method may further includes the step of determining feature weights for all feature functions. The step of placing a token before a first utterance in the recognized text and after each command in the recognized text may be included. The step of outputting the command to a device for executing the command includes a speech recognizer for providing the recognized text may also be included.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
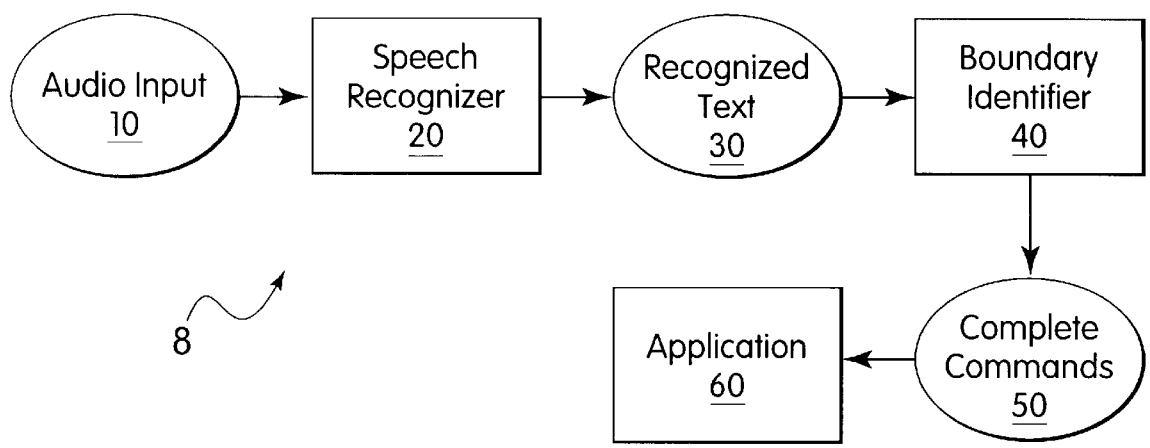
FIG. 1 is a block/flow diagram of a system/method of which includes a boundary identifier, according to the present invention.

The present invention relates to speech recognition and, more particularly, to an apparatus and method for identifying command boundaries from natural conversational speech. The present invention includes a trainable system which automatically identifies commands words or phrases from conversational natural language. The invention provides a more user friendly interface which permits a user to speak more naturally and continually without manual indication of command boundaries. A maximum entropy identification model is preferably used that has all correct command boundaries marked. During training, a set of features and their weights are iteratively selected using the training data. The features include words and phrases, as well as their relative positions to potential command boundaries of the speech. Alternate embodiments of the present invention include a more effective language model to be used to generate additional useful tokens for the identification model.

The present invention provides an apparatus that can automatically identify the command boundaries in a conversational natural language user interface. Advantageously, the present invention is trainable with additional data to improve performance, or with data from a new domain to allow the use of the apparatus in a new domain. The present invention may also identify and separate multiple commands included in a single utterance. The present invention uses minimal computational resources during identification to allow its use in a real-time system.

The present invention uses statistical techniques both from natural language understanding and from speech recognition.

Preferably by using a maximum entropy identification model, training data is first marked with the command boundaries. For each command boundary, all the surrounding words within a window (including words which are both to the left and to the right of the boundary) are marked to indicate their relative position with respect to the boundary. The training data which is thus processed is then subjected to maximum entropy style feature extraction, with the features including words and phrases, as well as their relative position to the boundary. The corresponding weights for the features are estimated using an iterative algorithm. During decoding, the test sentences are processed similarly to mark the relative position of each of the words in the current string, with respect to a hypothesized location of the command boundary. When possible, words occurring after the hypothesized location of the boundary are also marked. Then, the decision of whether or not to declare the hypothesized location as a command boundary is made by examining the product of the weights for the features that are present.

The present invention also includes ways to strengthen the maximum entropy identification model. One such enhancement includes using a more effective language model at the speech recognition stage. All the command boundaries in the language model training data are advantageously marked with a token, and an additional set of baseforms for the boundary (most of the baseforms corresponding to various forms of silence) are included in the model. With this addition, the speech recognition engine produces a string of text with additional tokens to suggest potential command boundaries. Other enhancements to the identification model, such as taking advantage of extended periods of silence, are also described.

Besides identifying the command boundary, the present invention may be used to recognize multiple commands in the same sentence. This alleviates the need to construct and support compound commands, since sentences including multiple commands may be automatically decomposed using the same command boundary identification process. It should be understood that the elements shown in FIGS. 1–5 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a flow/block diagram is shown of an example of a system 8 that includes a boundary identifier, according to the present invention. An audio input 10 is generated by a user of system 8, and is in the form of a spoken command issued to system 8. For example, if the system is an electronic mail application, then an example of a command issued by the user may be "check new mail" or "show me the next message". Audio input 10 is converted to recognized text 30, by a speech recognizer 20. The construction of speech recognizer 20 is known to those skilled in the art. Recognized text 30 is an input to a boundary identifier 40, which generates a complete command 50 as output. If recognized text 30 is a complete command, recognized text 30 is sent as the output. If recognized text 30 is not a complete command, then no output is sent. For the electronic mail application, examples of recognized text that may be a complete command are "check new mail" and "show me the next message", and examples of recognized text that are not a complete command are "check new", "show me the" and "check new mail show". Complete command 50 is used by an application 60. Application 60 is preferably a software application and complete commands 50 may be used open the software application and otherwise interface therewith. The present invention finds utility in many applications, for example, system 8 may interface with mechanical equipment or electronic devices. System 8 can transfer verbal commands or audio signals into executable signals to, for example, turn on/off an appliance or adjust features or functions of the equipment/devices.

Figure 2:
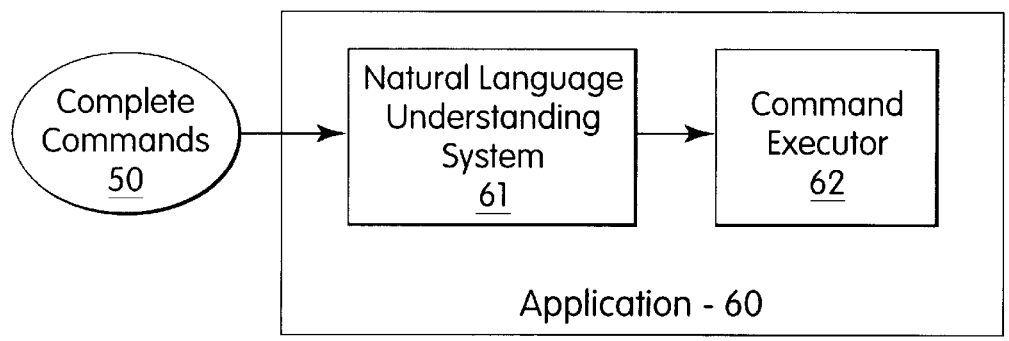
FIG. 2 is a block/flow diagram of an application that uses complete commands generated by a boundary identifier, according to the present invention.

Referring to FIG. 2, a block/flow diagram of an example of an application 60 that uses a complete command is shown. Application 60 preferably includes a natural language understanding system 61 and a command executor 62.

The information included in complete command 50 is analyzed and interpreted by natural language understanding system 61 to generate a formal command, and the formal command is executed by command executor 61. For example, if the complete command is "do I have any new messages", then the natural language understanding system may translate this into a command such as CheckNewMessage (), and submit the command to command executor 62.

Figure 3:
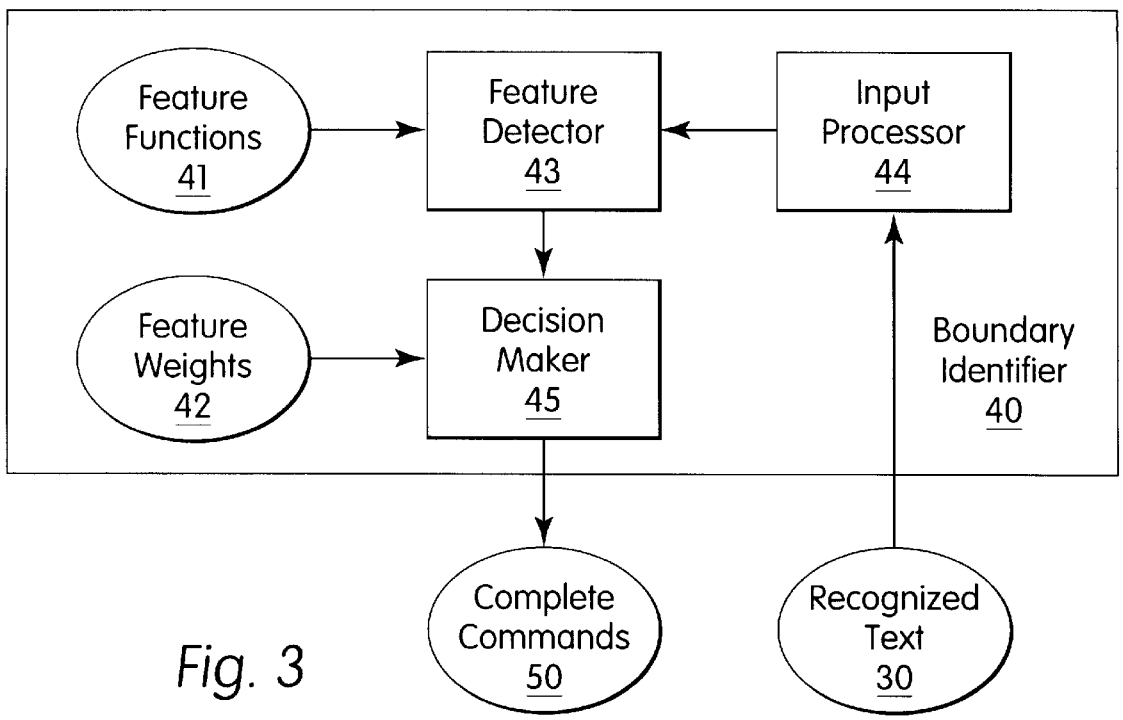
FIG. 3 is a block/flow diagram of a boundary identifier, according to the present invention.

Referring to FIG. 3, a block/flow diagram of an example of a boundary identifier 40 is shown. Boundary identifier 40 takes recognized text 30 as an input and produces complete command 50 as the output. Boundary identifier 40 includes feature functions 41, feature weights 42, a feature detector 43, an input processor 44 and a decision maker 45. Boundary identifier 40 will now be described by way of example. Other boundary symbols may be used within the scope of the invention. Given one or more words that comprises recognized text 30, which may be denoted as S, boundary identifier 40 decides if S is a complete command. The decision, denoted by T is set to T=1 if S is a complete command, and it is set to T=0 otherwise. If S is a complete command, recognized text 30 is sent as the output of boundary identifier 40, which is complete command 50. Boundary identifier 40, therefore, is responsible for evaluating the conditional probability P(T|S) for both of the values T and selecting as the decision that T which maximizes P(T|S).

Boundary identifier 40 needs a model built from training data that can generate the values P(T|S). The present invention preferably generates the values P(T|S) by using a maximum entropy principle as described by A. Berger et al., "A Maximum Entropy Approach to Natural Language Processing," Computational Linguistics, Vol. 22, No. 1, pp. 39–71, March 1996, incorporated herein by reference. Other components, such as feature detector 43, input processor 44 and decision maker 45, as well as feature functions 41 and feature weights 42 will be described in greater detail below.

Figure 4:
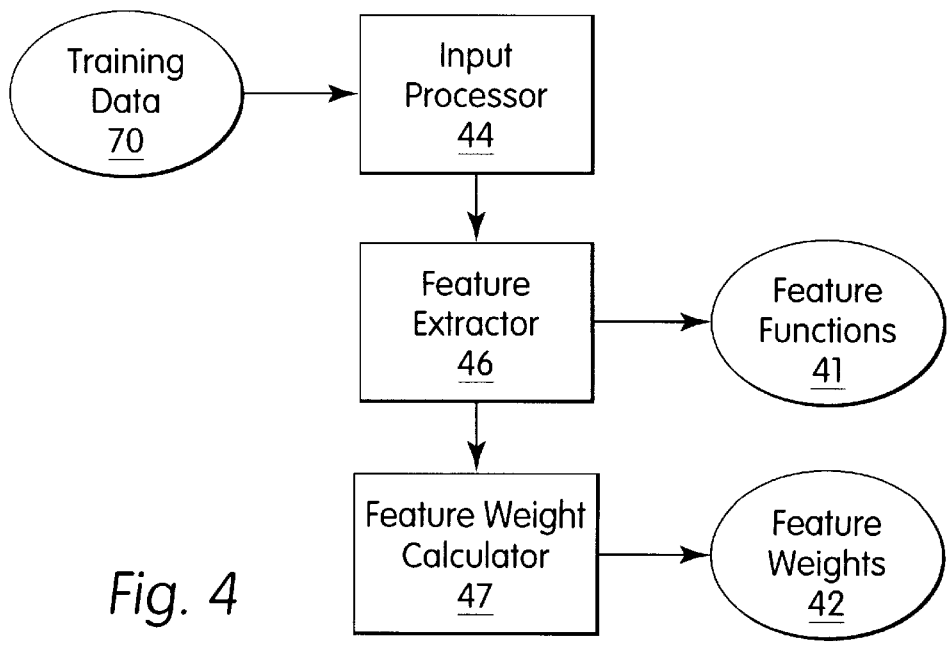
FIG. 4 is a block/flow diagram of an apparatus that generates feature functions and feature weights used by the boundary identifier, according to the present invention.

Referring to FIG. 4, a block/flow diagram of an example of maximum entropy model construction is shown. Training data 70 includes a large number of training utterances relevant to the domain, corresponding to complete commands. From these utterances, a set of utterances are generated that do not correspond to complete commands, and these utterances are also added to training data 70. For every entry in this augmented set of training data, the correct decision (T=0 or T=1) may also be determined. For the electronic mail example discussed earlier, where the utterance "check new mail" was followed by "show me the first message", the following entries may be made in the training data.

check // T=0
check new // T=0
check new mail // T=1
check new mail show // T=0
check new mail show me // T=0

In the last two entries, words from a subsequent utterance have been added, namely "show" and "show me". Such entries are sometimes desirable to resolve certain ambiguities that may arise. For example, utterances such as "delete", "delete this" and "delete this one" are all complete commands. In these cases, although "delete" by itself may be a complete command, it is not so when followed by "this", and similarly, "delete this" is not a complete command when followed by "one". Hence, this "look ahead" step is necessary, and the number of words to look ahead, also known as a window size of the look ahead step, is one of the parameters of the present invention. In one embodiment of the invention, a window size of two words is provided, although other window sizes may be included depending on the application.

Input processor 44 processes training data 70. For every possible position of the command boundary, also known as the hypothesized location of the command boundary, input processor 44 augments each word in the training set with −n if the word is n positions to the left of the hypothesized command boundary, and with +n if the word is n positions to the right of the hypothesized command boundary. After the processing by input processor 44, the entries in the processed training set will look like:

check−1 // T=0
check−2 new−1 // T=0
check−3 new−2 mail−1 // T=1
check−4 new−3 mail−2 show−1 // T=0
check−5 new−4 mail−3 show−2 me−1 // T=0
check−3 new−2 mail−1 show+1 // T=1
check−3 new−2 mail−1 show+1 me+2 // T=1
check−4 new−3 mail−2 show−1 me+1 // T=0

In the above example, the additional entries have been added to accommodate the look ahead process described earlier.

Turning again to FIG. 4, input processor 44 processes the training data 70, and the processed training data is used by feature extractor 46 to produce feature functions 41. In one embodiment of this invention, feature functions may be of the form:

$$f_{t,s}^i(T, S) = \begin{cases} 1 \text{ if } t = T, s \in S \\ 0 \text{ otherwise} \end{cases} \quad (\text{EQ. 1})$$

are used, where i is the index of the feature, with i=1, . . . , n, and the total number if features is n. The feature functions include one or more words from the processed training data, along with the correct decision. For example, consider the feature $$f_{(new-2 \; mail-1), \; (T-1)}$$

This feature is used if the utterance S includes the word "new" and "mail" at the first and seconds positions, respectively, to the left of the hypothesized command boundary, for the case where T=1. The total number of features, n, is a parameter of the invention, and its value depends on the application. Each feature function 41 includes one or more words with the relative positions augmented, along with the corresponding decision (T=0 or T=1). The selection of feature functions 41 from training data 70 processed by the input processor is known in the art, and may be done as described in Papineni et al., "Feature-Based Language Understanding," *EUROSPEECH,* Rhodes, Greece, 1997, incorporated herein by reference.

Turning again to FIG. 4, after the feature extractor 46 produces feature functions 41, a feature weight calculator 47 calculates features weights 42, including weight $\alpha_i$ for feature function $f_{t,s}^i$ for all n feature functions. In one embodiment of the invention, to calculate feature weights 42, an Improved Iterative Scaling algorithm described in S. Della Pietra et al.,"Inducing Features of Random Fields," Technical Report CMU-CS95-144, School of Computer Science, Carnegie Mellon University, 1995, is used and incorporated herein by reference. The maximum entropy model, as derived in A. Ratnaparkhi, "A Simple Introduction to Maximum Entropy Models for Natural Language Processing," Institute for Research in Cognitive Science, Report 97-08, University of Pennsylvania, May 1997, incorporated herein by reference, for the joint distribution P(T|S) is given by $$P(T, S) = \mu \prod_{i=1}^{n} \alpha_i^{f_{i,s}^i(T,S)} \quad (EQ. 2)$$

where $\mu$ is normalization constant.

Returning to FIG. 3, for every utterance in recognized text 30, input processor 44 augments the relative position of each word in the utterance relative to a given hypothesized command boundary location, and repeats this augmentation for all possible command boundary locations. Feature detector 43 determines which feature functions 41 are present in a given processed utterance, and decision maker 45 makes the final decision as to whether or not the given processed utterance is a complete command. The decision maker first calculates P(T=1|S) given by $$P(T = 1|S) = \frac{P(T = 1, S)}{P(T = 1, S) + P(T = 0, S)} \quad (EQ. 3)$$

and the utterance S is declared as a complete command if and only if $$P(T=1|S) > P(T=0|S) \quad (EQ. 4)$$

One embodiment of the present invention may be used to improve the performance of the invention. This embodiment includes using a new token to indicate the beginning of the utterance. Using a token of, for example, "SB" to indicate the beginning of the utterance, the entries in the processed training set may look like the following:

SB–4 check–3 new–2 mail–1 // T=1
SB–5 check–4 new–3 mail–2 show–1 // T=0
SB–4 check–3 new–2 mail–1 show+1 me+2 // T=1
SB–5 check–4 new–3 mail–2 show–1 me+1 // T=0

This adds an additional step to the processing of input processor 44 in FIG. 3 and FIG. 4. In FIG. 4, every utterance in training data 70 may include the SB token at the beginning of each utterance. In FIG. 3, the SB token may be inserted before the first utterance, and for subsequent utterances, it is preferably inserted after every declared command boundary. Other tokens and placements thereof are contemplated as well by the present invention.

Figure 5:
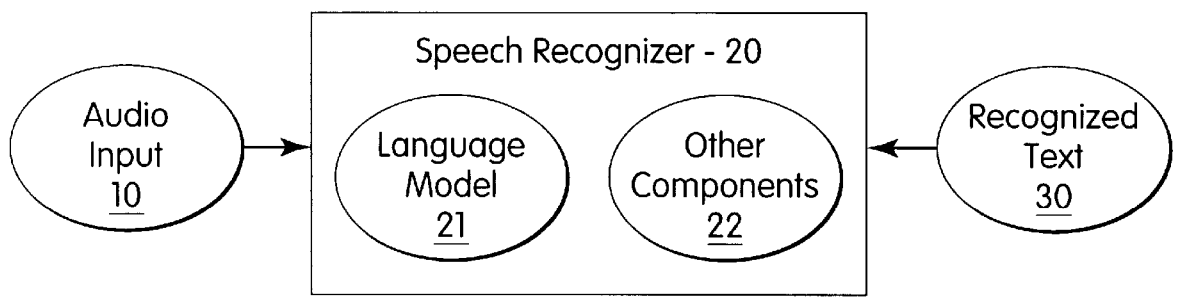
FIG. 5 is a block diagram of a speech recognizer that generates recognized text to be used by the boundary identifier, according to the present invention.

Referring to FIG. 5, a block/flow diagram of a example of another embodiment of the present invention is shown. Speech recognizer 20 includes a language model 21 and other components 22. In one embodiment of the present invention, language model 21 is enhanced so that speech recognizer 20 can produce recognized text 30 that also includes a new token, for example, SE that suggests a possible location for the command boundary. With this enhancement, speech recognizer 20 produces recognized text 30 that includes utterances, for example, "check new mail SE show me the first message SE . . . ". To accomplish this, language model 21 is preferably built using data that has the SE tokens inserted at the end of each complete command. The language model may be built using procedures described in the F. Jelinek, incorporated by reference above. To support the new SE tokens, acoustic baseforms for this token are added to speech recognizer 20. Acoustic baseforms for this token, corresponding to various forms of silences, are added to the model. In one embodiment, the following acoustic baseforms are used for the SE token:

D$
X
XX
XXX
X AA X
X AO M X
X AO X
X AX X
X F X
X HH X
X K X
X P X
X TD X

Referring again to FIG. 4, training data 70 is first subjected to speech recognizer 20 to produce the SE tokens, and input processor 44 generates processed data that may look like SB–5 check–4 new–3 mail–2 SE–1 // T=1
SB–6 check–5 new–4 mail–3 SE–2 show–1 // T=0
SB–5 check–4 new–3 mail–2 SE–1 show+1 me+2 // T=1
SB–6 check–5 new–4 mail–3 show–2 SE–1 me+1 // T=0

Another embodiment of the present invention uses any extended period of silence present in the utterances. With this embodiment, decision maker 45 in FIG. 3 may declare a command boundary if the condition specified by EQ. 4 is satisfied, or if there is an extended period of silence between utterances. In one embodiment of the invention, if there is silence for 3 seconds or more, for example, decision maker 45 declares a command boundary. In another embodiment of the invention, the user may choose the desirable length of the silence by means of options provided by the interface to system 8.

The invention described herein for identifying the command boundaries may also be used to recognize the presence of multiple commands in the same utterance. A command boundary may be placed after each portion of the utterance corresponding to a complete command, thus decomposing the input utterance into multiple commands. For example, if the sentence "check for new mail show me the first one" is input the output could be:

SB–5 check–4 new–3 mail–2 SE–1 // T=1
SB–7 show–6 me–5 the–4 first–3 one–2 SE–1 // T=1.

Having described preferred embodiments of a command boundary identifier for conversational natural language (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An apparatus for automatically identifying command boundaries in a conversational natural language system, comprising:

a speech recognizer for converting an input signal to recognized text; and a command boundary identifier coupled to the speech recognizer for receiving the recognized text and determining if a command is present in the recognized text, the boundary identifier outputting the command if present in the recognized text, wherein the boundary identifier includes an input processor to process the recognized text by augmenting each word in the recognized text by the word's relative position with respect to a hypothesized command boundary.

2. The apparatus as recited in claim 1, wherein the boundary identifier outputs to an application which executes the command.

3. The apparatus as recited in claim 1, wherein the boundary identifier further comprises a feature detector coupled to the input processor, the feature detector for determining which feature functions are present, from a set of feature functions, in the processed recognized text.

4. The apparatus as recited in claim 3, wherein the boundary identifier further comprises a decision maker for determining if a command is present in the processed recognized text according to a set of feature weights corresponding to the feature functions in the processed recognized text.

5. The apparatus defined in claim 4, wherein the decision maker is coupled to the feature detector and decides if the processed recognized text includes a command boundary.

6. The apparatus as recited in claim 1, further comprising a training system for training the apparatus to recognize text and to recognize complete commands.

7. The apparatus as recited in claim 6, wherein the training system includes an input processor for processing a collection of training data comprising utterances which include complete commands and other than complete commands.

8. The apparatus as recited in claim 7, wherein the input processor inserts a token before each utterance in the training data.

9. The apparatus as recited in claim 7, wherein the input processor inserts a token before a first utterance in the recognized text, and after every command in the recognized text.

10. The apparatus as recited in claim 6, further comprising a feature extractor for extracting feature functions including words and relative positions of the words with respect to a hypothesized boundary location.

11. The apparatus as recited in claim 1, wherein the speech recognizer includes a language model that has been trained using training data, the training data including a token inserted to indicate a location of a command boundary in the training data.

12. The apparatus as recited in claim 11, wherein the speech recognizer includes additional baseforms for the token.

13. The apparatus as recited in claim 12, wherein the speech recognizer produces the recognized text including the token.

14. The apparatus as recited in claim 1, wherein the boundary identifier declares a command boundary when there is an extended period of silence in the recognized text.

15. A program storage device readable by machine, tangibly embodying a program of instructions executable by the machine to perform method steps for identifying commands in recognized text, the method steps comprising:

inputting recognized text;

processing the recognized text by augmenting words of the recognized text with a position relative to a hypothesized command boundary;

determining feature functions in the processed recognized text in accordance with a set of feature functions;

deciding whether the processed recognized text with feature functions identified includes a command, the decision being made based on weighting of the feature functions; and if a command is included, outputting the command.

16. The program storage device as recited in claim 15, further comprising a program of instructions for training the program storage device by inputting training data including utterances comprising commands and other than commands.

17. The program storage device as recited in claim 16, wherein the program of instructions for training the program storage device includes the step of placing a token before each utterance.

18. The program storage device as recited in claim 16, wherein the program of instructions for training the program storage device includes the step of placing a token after each command boundary included in the utterances.

19. The program storage device as recited in claim 15, wherein the program of instructions for training the program storage device includes the step of extracting feature functions from the training data.

20. The program storage device as recited in claim 15, wherein the program of instructions for training the program storage device includes the step of determining feature weights for all feature functions.

21. The program storage device as recited in claim 15, wherein the program of instructions for processing the recognized text includes the step of placing a token before a first utterance in the recognized text and after each command in the recognized text.

22. The program storage device as recited in claim 15, further includes a speech recognizer for providing the recognized text.

23. A method for identifying command in natural conversational language comprising the steps of:

inputting recognized text;

processing the recognized text by augmenting words of the recognized text with a position relative to a hypothesized command boundary;

determining feature functions in the processed recognized text in accordance with a set of feature functions;

deciding whether the processed recognized text with feature functions identified includes a command, the decision being made based on weighting of the feature functions; and if a command is included, outputting the command.

24. The method as recited in claim 23, further comprising the step of inputting training data including utterances comprising commands and other than commands to an input processor.

25. The method as recited in claim 24, further comprising the step of placing a token after command boundaries included in the utterances.

26. The method as recited in claim 24, further comprising the step of extracting feature functions from the training data.

27. The method as recited in claim 24, further comprising the step of determining feature weights for all feature functions.

28. The method as recited in claim 24, further comprising the step of placing a token before a first utterance in the recognized text and after each command in the recognized text.

29. The method as recited in claim 23, further comprising the step of placing a token before each utterance of the training data.

30. The method as recited in claim 23, further comprising the step of outputting the command to a device for executing the command includes a speech recognizer for providing the recognized text.

* * * * *